(12) United States Patent
Endres et al.

(10) Patent No.: US 8,163,677 B2
(45) Date of Patent: Apr. 24, 2012

(54) CONSOLIDATION AGENTS AND THE USE THEREOF FOR CONSOLIDATING MOLDED BODIES AND GEOLOGICAL FORMATIONS CONSISTING OF POROUS OR PARTICULATE MATERIALS

(75) Inventors: Klaus Endres, Homburg (DE); Helmut Schmidt, Saarbruecken-Guedingen (DE); Bernd Reinhard, Merzig-Brotdorf (DE)

(73) Assignee: Leibniz-Institut fuer Neue Materialien Gemeinnuetzige GmbH, Saarbruecken (DE)

( * ) Notice: Subject to any disclaimer, the term of this patent is extended or adjusted under 35 U.S.C. 154(b) by 325 days.

(21) Appl. No.: 10/587,362

(22) PCT Filed: Jan. 28, 2005

(86) PCT No.: PCT/EP2005/000871
§ 371 (c)(1),
(2), (4) Date: Sep. 28, 2006

(87) PCT Pub. No.: WO2005/073278
PCT Pub. Date: Aug. 11, 2005

(65) Prior Publication Data
US 2007/0158070 A1 Jul. 12, 2007

(30) Foreign Application Priority Data
Jan. 29, 2004 (DE) .......................... 10 2004 004 615

(51) Int. Cl.
*C09K 8/60* (2006.01)
*E21B 43/267* (2006.01)
*E21B 33/13* (2006.01)
*E21B 33/00* (2006.01)

(52) U.S. Cl. ............. 507/233; 166/280.2; 166/281; 166/285; 166/293; 166/294

(58) Field of Classification Search ............... 507/233; 166/280.2, 281, 285, 293, 294
See application file for complete search history.

(56) References Cited

U.S. PATENT DOCUMENTS

| | | | |
|---|---|---|---|
| 2,706,190 A | 4/1955 | Clark | |
| 3,024,215 A | 3/1962 | Freeman et al. | |
| 3,258,382 A | 6/1966 | Vincent | |
| 3,619,255 A | 11/1971 | Lengnick et al. | |
| 3,672,833 A | 6/1972 | Teichner et al. | |
| 3,806,491 A | 4/1974 | Gardikes et al. | |
| 4,177,317 A | 12/1979 | Schoenafinger et al. | |
| 4,243,692 A | 1/1981 | Scholze et al. | |
| 4,308,371 A * | 12/1981 | Tanaka et al. ................. 528/18 |
| 4,366,187 A | 12/1982 | Gabriel | |
| 4,374,696 A | 2/1983 | Schmidt et al. | |
| 4,386,134 A | 5/1983 | Puhringer | |
| 4,417,623 A | 11/1983 | Anthony | |
| 4,746,366 A | 5/1988 | Philipp et al. | |
| 4,766,949 A | 8/1988 | Jhaveri et al. | |
| 4,840,666 A | 6/1989 | Schmidt et al. | |
| 5,280,098 A | 1/1994 | Witucki et al. | |
| 5,365,995 A | 11/1994 | Warner | |
| 5,731,091 A | 3/1998 | Schmidt et al. | |
| 5,734,000 A * | 3/1998 | Popall et al. ................. 528/32 |
| 5,746,992 A | 5/1998 | Yoldas et al. | |
| 5,766,680 A | 6/1998 | Schmidt et al. | |
| 5,858,280 A * | 1/1999 | Zhang et al. ................. 516/104 |
| 5,917,075 A | 6/1999 | Wolter | |
| 6,121,187 A | 9/2000 | Maier | |
| 6,162,498 A | 12/2000 | Mennig et al. | |
| 6,287,639 B1 * | 9/2001 | Schmidt et al. ............. 427/387 |
| 6,378,599 B1 * | 4/2002 | Schmidt et al. ............. 164/525 |
| 6,432,191 B2 | 8/2002 | Schutt | |
| 6,451,382 B2 | 9/2002 | Schutt et al. | |
| 6,513,592 B2 * | 2/2003 | Espin et al. ................. 166/295 |
| 6,555,236 B1 | 4/2003 | Nakamura et al. | |
| 6,743,517 B2 | 6/2004 | Nakamura et al. | |
| 6,984,483 B1 | 1/2006 | Roscher et al. | |
| 2001/0024719 A1 | 9/2001 | Lewis | |
| 2001/0030038 A1 | 10/2001 | Schutt et al. | |
| 2001/0032568 A1 | 10/2001 | Schutt | |
| 2001/0056141 A1 | 12/2001 | Schutt | |
| 2002/0102417 A1 | 8/2002 | Schutt et al. | |

FOREIGN PATENT DOCUMENTS

| | | |
|---|---|---|
| DE | 38 36 815 | 7/1990 |
| EP | 0075962 | 4/1983 |
| EP | 0 171 493 | 2/1986 |
| EP | 0273867 | 7/1988 |
| JP | 2002-275418 A | 9/1925 |
| JP | 60-190473 A | 9/1985 |
| JP | 9-504768 A | 5/1997 |
| JP | 10-500072 A | 1/1998 |
| JP | 2001-72442 A | 3/2001 |
| JP | 2004-521988 A | 7/2004 |

OTHER PUBLICATIONS

Sigma-Aldrich MSDS datasheet (triethoxyphenylsilane).* Sigma-Aldrich MSDS datasheet (tetraethoxysilane).*
Sigma-Aldrich MSDS datasheet (triethoxyphenylsilane), Jul. 25, 2010.*
Sigma-Aldrich MSDS datasheet (tetraethoxysilane), Mar. 12, 2010.*
U.S. Appl. No. 11/814,363 (Schmidt et al.), filed Jul. 20, 2007 and entitled "Hydrolytically and Hydrothermally Stable Consolidated Proppants and Method for the Production Thereof".

(Continued)

*Primary Examiner* — Timothy J. Kugel
*Assistant Examiner* — Aiqun Li
(74) *Attorney, Agent, or Firm* — Abel Law Group, LLP

(57) ABSTRACT

A consolidation agent for molded articles and geological formations from porous or particulate materials, containing a hydrolysate or precondensate of
(a) at least one organosilane of the general formula (I)

$$R_nSiX_{4-n} \qquad (I)$$

in which the radicals R are identical or different and are not hydrolytically removable groups, the radicals X are identical or different and are hydrolytically removable groups or hydroxyl groups, and n is 1, 2 or 3, and optionally (b) at least one hydrolyzable silane of the general formula (II)

$$SiX_4 \qquad (II)$$

in which the radicals X have the meaning defined above.

18 Claims, No Drawings

OTHER PUBLICATIONS

U.S. Appl. No. 11/721,203 (Schmidt et al.), filed Jun. 8, 2007 and entitled "Hydrolytically and Hydrothermally Stable Consolidation or Change in the Wetting Behavior of Geological Formations".

U.S. Appl. No. 11/721,201 (Endres et al.), filed Jun. 8, 2007 and entitled "Consolidating Agent and Use Thereof for the Production of Hydrolysis-Stable Molded Members and Coatings".

English Language Abstract of EP 0 075 962, Apr. 6, 1983.
English Language Abstract of EP 0 273 867, Jul. 6, 1988.
An English language abstract of DE 38 36 815, Jul. 26, 1990.

\* cited by examiner

CONSOLIDATION AGENTS AND THE USE THEREOF FOR CONSOLIDATING MOLDED BODIES AND GEOLOGICAL FORMATIONS CONSISTING OF POROUS OR PARTICULATE MATERIALS

CROSS-REFERENCE TO RELATED APPLICATIONS

The present application is a U.S. National Stage of International Application No. PCT/EP2005/000871, filed Jan. 28, 2005, which claims priority of German Patent Application No. 10 2004 004615.8, filed Jan. 29, 2004.

BACKGROUND OF THE INVENTION

1. Field of the Invention

The invention relates to a composition for consolidating moulded articles and geological formations from porous or particulate materials.

2. Discussion of Background Information

The preparation of composite materials from particulate systems with suitable binding agents is especially difficult, if the composite materials should not lose its porosity considerably compared to a binder-free packing. Thus, porous composites can be prepared e.g. with organic polymeric binding agents, but it becomes apparent that it is hardly possible to maintain the original porosity. It is possible to prepare porous systems by a reduced use of binding agent, however, such composites are not suitable for many applications, in particular at higher temperatures and in the environment of organic liquids due to the property of the organic polymers to swell up or become dissolved in the presence of organic solvents.

Although the use of purely inorganic binding agents, which are available e.g. by the sol-gel process, results in binding with which a corresponding porosity is maintained in the moulded article, the bonded system is very brittle, flawy and not sufficiently resistant to mechanical loading such as shear loading or intense pressure load.

A special field of consolidation of particulate materials is crude oil recovery, in which bore-holes are often driven in non-consolidated geological formations. In particular in the case of offshore exploitation, there are sand containing geological formations that have to be consolidated to avoid penetration of sand and other rock particles into the bore-hole, which is connected with damage of the conveying devices and with contamination of the crude oil recovered. Usually, a three-stage process is used for consolidation of such sand fields. At first, a synthetic resin binding agent is injected through a probe, after which it is cured by injection of an activation system. In a third step a system for controlling permeability and for pushing out a surplus of resin binding agent is injected.

It was an object of the invention to provide a consolidation agent for moulded articles and geological formations from porous or particulate materials, e.g. sand containing geological formations, achieving a good binding strength with sufficient flexibility and a porosity essentially not reduced and maintaining its binding properties also in the case of soiled particulate materials, in particular also in the case of not degreased or oil containing particles.

SUMMARY OF THE INVENTION

The present invention provides a consolidation agent for molded articles and geological formations comprising porous and/or particulate materials. The agent comprises a hydrolysate and/or a precondensate of (a) one or more organosilanes of formula (I)

$$R_n SiX_{4-n} \qquad (I)$$

wherein the radicals R independently represent non-hydrolysable groups, the radicals X independently represent hydrolysable groups or hydroxyl groups, and n is 1, 2 or 3; and (b) optionally, one or more hydrolysable silanes of formula (II)

$$SiX_4 \qquad (II)$$

wherein the radicals X are as defined for formula (I).

In one aspect of the agent, the radicals X may comprise one or more radicals selected from halogen, alkoxy and acyloxy groups. For example, they may comprise one or more radicals selected from $C_{2-4}$ alkoxy groups.

In another aspect of the agent, the radicals R may comprise one or more radicals selected from $C_{1-4}$ alkyl groups and aryl groups. For example, the radicals R may comprise one or more radicals selected from methyl and ethyl and/or may comprise a phenyl group.

In yet another aspect, the agent of the present invention may comprise a hydrolysate and/or a precondensate of compounds comprising (a1) an alkylsilane, (a2) an arylsilane and (b) an orthosilicic ester. For example, the agent may comprise a hydrolysate and/or a precondensate of compounds comprising or consisting of methyltriethoxysilane, phenyltriethoxysilane and tetraethoxysilane.

In a still further aspect of the agent of the present invention, the hydrolysate and/or precondensate may have been prepared in the presence of one or more metal compounds of formula (III)

$$MX_a \qquad (III)$$

wherein M is selected from metals of the main groups I to VIII and the subgroups II to VIII of the Periodic Table of Elements and wherein the radicals X independently represent hydrolysable groups or hydroxyl groups and two radicals X may be combined to form an oxo group and a corresponds to the valence of M. For example, the one or more metal compounds may comprise at least one metal M which is selected from Al, B, Sn, Ti, Zr, V and Zn, e.g., from Al, Ti and Zr. In another aspect, the one or more metal compounds of formula (III) may comprise one or more alkoxides of at least one of Na, K, Al, Zr and Ti.

In another aspect, the agent may have been prepared according to the sol-gel process using a substoichiometric amount of water relative to the hydrolysable radicals X present.

The present invention also provides a solution or emulsion which comprises the consolidating agent of the present invention as set forth above, including the various aspects thereof.

The present invention also provides a process for preparing a consolidated molded article. The process comprises mixing and/or coating a material which is porous and/or particulate with the consolidating agent of the present invention as set forth above, including the various aspects thereof, and thereafter curing the agent. The present invention also provides a consolidated molded article which is obtainable by this process as well as process for consolidating a geological formation wherein the consolidated molded articles are introduced into channels within the geological formation.

In one aspect of the process, the consolidating agent may be activated by the addition of water prior to being combined with the material to be consolidated.

The present invention also provides a process for consolidating a porous and/or particulate geological formation. The process comprises injecting the consolidating agent of the present invention as set forth above, including the various aspects thereof, into the formation and/or infiltrating the formation with the agent and thereafter curing the agent.

In one aspect of this process, the formation may be oil-bearing and comprise sand.

DETAILED DESCRIPTION OF THE INVENTION

The invention relates to a consolidation agent for moulded articles and geological formations from porous or particulate materials, containing a hydrolysate or precondensate of
(a) at least one organosilane of the general formula (I)

$$R_nSiX_{4-n} \qquad (I)$$

in which the radicals R are identical or different and are not hydrolytically removable groups, the radicals X are identical or different and are hydrolytically removable groups or hydroxyl groups, and n is 1, 2 or 3, preferably 1 or 2, and optionally
(b) at least one hydrolyzable silane of the general formula (II)

$$SiX_4 \qquad (II)$$

in which the radicals X have the meaning defined above.

Suitable examples of groups X which are removable hydrolytically are hydrogen, halogen (F, Cl, Br or I, in particular Cl or Br), alkoxy (for example $C_{1-6}$-alkoxy, such as methoxy, ethoxy, n-propoxy, i-propoxy and n-, i-, sec.- or t-butoxy), aryloxy (in particular $C_{6-10}$-aryloxy, such as phenoxy), alkaryloxy, e.g. benzoyloxy, acyloxy (for example $C_{1-6}$-acyloxy, in particular $C_{1-4}$-acyloxy, such as acetoxy or propionyloxy) and alkylcarbonyl (e.g. $C_{2-7}$-alkylcarbonyl, such as acetyl). Radicals which are likewise suitable are $NH_2$, amino mono- or disubstituted with alkyl, aryl and/or aralkyl, wherein examples for the alkyl, aryl and/or aralkyl residues are those mentioned below for R, amido, such as benzamido and aldoxime or ketoxime groups. Two or three groups X may also be linked together, for example in Si-polyol complexes with glycol, glycerol or pyrocatechol. Said groups may optionally contain substituents, such as halogen, hydroxyl, alkoxy, amino or epoxy.

Preferred radicals X which are removable hydrolytically are halogen, alkoxy groups and acyloxy groups. Particularly preferred hydrolytically removable radicals are $C_{2-4}$-alkoxy groups, in particular ethoxy.

The radicals R, which are not hydrolytically removable are for example alkyl (e.g. $C_{1-20}$-alkyl, in particular $C_{1-4}$-alkyl such as methyl, ethyl, n-propyl, i-propyl, n-butyl, i-butyl, sec-butyl and tert-butyl), alkenyl (e.g. $C_{2-20}$-alkenyl, in particular $C_{2-4}$-alkenyl, such as vinyl, 1-propenyl, 2-propenyl and butenyl), alkynyl (e.g. $C_{2-20}$-alkynyl, in particular $C_{2-4}$-alkynyl, such as acetylenyl and propargyl), aryl (in particular $C_{6-10}$-aryl, such as phenyl and naphthyl) and corresponding aralkyl and alkaryl groups, such as tolyl and benzyl, and cyclic $C_{3-12}$-alkyl and alkenyl groups, such as cyclopropyl, cyclopentyl and cyclohexyl.

The radicals R may have common substituents which may be functional groups through which also crosslinking of the condensates via organic groups is possible, if desired. Common substituents are for example halogen (e.g. chlorine or fluorine), epoxide (e.g. glycidyl or glycidyloxy), hydroxyl, ether, ester, amino, monoalkylamino, dialkylamino, optionally substituted anilino, amide, carboxyl, alkenyl, alkynyl, acryl, acryloxy, methacryl, methacryloxy, mercapto, cyano, alkoxy, isocyanato, aldehyde, keto, alkylcarbonyl, acid anhydride and phosphoric acid. These substituents are attached to the silicon atom via divalent bridge groups, in particular alkylene, alkenylene or arylene bridge groups, which may be interrupted by oxygen or by —NH-groups. The bridge groups contain for example 1 to 18, preferably 1 to 8 and in particular 1 to 6 carbon atoms. Said divalent bridge groups are derived, for example, from the abovementioned monovalent alkyl, alkenyl or aryl radicals. Of course, radical R may also have more than one functional group.

Preferred examples of radicals R which are not hydrolytically removable containing functional groups by way of which crosslinking is possible are a glycidyl- or a glycidyloxy-($C_{1-20}$)-alkylene radical, such as β-glycidyloxyethyl, γ-glycidyloxypropyl, δ-glycidyloxybutyl, ε-glycidyloxypentyl, ω-glycidyloxyhexyl, and 2-(3,4-epoxycyclo-hexyl)ethyl, a (meth)acryloxy-($C_{1-6}$)-alkylene radical, for example (meth)acryloxy-methyl, (meth)acryloxyethyl, (meth)acryloxypropyl or (meth)acryloxybutyl, and a 3-isocyanatopropyl radical. Examples of fluorine substituted radicals R are 1H,1H,2H,2H-perfluorooctyl or 3,3,4,4,5,5,6,6,7,7,8,8-tridecafluorooctyl. Particularly preferred radicals are γ-glycidyloxypropyl und (meth)acryloxypropyl. In this context, (meth)acryl stands for acryl and methacryl.

Preferred radicals R are alkyl groups having preferably 1 to 4 carbon atoms, in particular methyl and ethyl, as well as aryl radicals such as phenyl.

Examples of organosilanes of the general formula (I) are compounds of the following formulae, wherein the alkylsilanes and in particular methyltriethoxysilane are especially preferred:

$CH_3—SiCl_3$, $CH_3—Si(OC_2H_5)_3$, $C_2H_5—SiCl_3$, $C_2H_5—Si(OC_2H_5)_3$, $C_3H_7—Si(OC_2H_5)_3$, $C_6H_5—Si(OC_2H_5)_3$, $(C_2H_5O)_3—Si—C_3H_6—Cl$, $(CH_3)_2SiCl_2$, $(CH_3)_2Si(OC_2H_5)_2$, $(CH_3)_2Si(OH)_2$, $(C_6H_5)_2SiCl_2$, $(C_6H_5)_2Si(OC_2H_5)_2$, $(i-C_3H_7)_3SiOH$, $CH_2=CH—Si(OOCCH_3)_3$, $CH_2=CH—SiCl_3$, $CH_2=CH—Si(OC_2H_5)_3$, $CH_2=CHSi(OC_2H_5)_3$, $CH_2=CH—Si(OC_2H_4OCH_3)_3$, $CH_2=CH—CH_2—Si(OC_2H_5)_3$, $CH_2=CH—CH_2—Si(OC_2H_5)_3$, $CH_2=CH—CH_2Si(OOCCH_3)_3$, $CH_2=C(CH_3)COO—C_3H_7—Si(OC_2H_5)_3$, $n-C_6H_{13}—CH_2—CH_2—Si(OC_2H_5)_3$, $n-C_8H_{17}—CH_2—CH_2—Si(OC_2H_5)_3$,

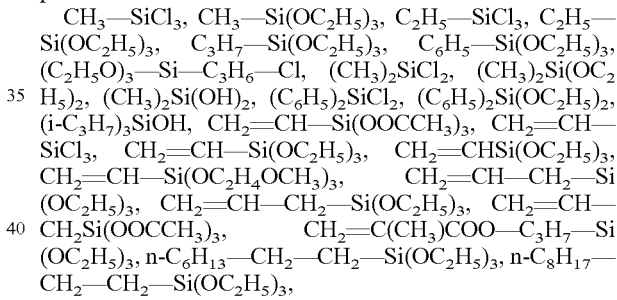

Examples of hydrolyzable silanes of the general formula (II) are $Si(OCH_3)_4$, $Si(OC_2H_5)_4$, $Si(O-n-$ or $i-C_3H_7)_4$, $Si(OC_4H_9)_4$, $SiCl_4$, $HSiCl_3$, $Si(OOCCH_3)_4$. Among these hydrolyzable silanes tetraethoxysilane is particularly preferred.

These silanes can be prepared by known methods; cf. W. Noll, "Chemie und Technologie der Silicone" [Chemistry and Technology of the Silicones], Verlag Chemie GmbH, Weinheim/Bergstraße, Germany (1968).

Preferably at least 30 mol %, more preferably at least 45 mol % and in particular at least 55 mol % organosilanes of the formula (I) having at least one group not hydrolytically removable are used for preparing the consolidation agent. The residue are hydrolyzable compounds, in particular the hydrolyzable silanes of the formula (II) that contain no groups which are not hydrolytically removable. For the calculation of quantitative ratios, the hydrolyzable compounds and silanes, respectively, generally mean the monomer compounds. As explained below, if compounds already precondensed (dimers etc.) are used as starting compounds, a recalculation to the corresponding monomers is to be effected.

In a particularly preferred embodiment the consolidation agent is prepared using an alkylsilane such as methyltriethoxysilane (MTEOS), an arylsilane such as phenyl-triethoxysilane and an orthosilicic ester such as tetraethoxysilane (TEOS).

Optionally, hydrolyzable metal compounds of elements, which are different from Si, may also be used for the preparation of the consolidation agent. Said compounds may replace up to 50 mol % of the hydrolyzable silane compounds (II). Preferably, these are metal compounds of the general formula (III)

$$MX_a \qquad (III)$$

in which M is a metal from main groups I to VIII or subgroups II to VIII of the Periodic Table of the Elements, X is defined as in formula (I), wherein two groups X may be replaced by an oxo group, and a corresponds to the valence of the element.

Examples of such metal compounds are compounds of glass-forming or ceramic-forming elements, especially compounds of at least one element M from main groups III to V and/or subgroups II to IV of the Periodic Table of the Elements.

Preferably the compounds in question are hydrolyzable compounds of Al, B, Sn, Ti, Zr, V or Zn, particularly those of Al, Ti or Zr, or of mixtures of two or more of these elements. For example, hydrolyzable compounds of elements of main groups I and II of the Periodic Table (e.g., Na, K, Ca and Mg) and of subgroups V to VIII of the Periodic Table (e.g., Mn, Cr, Fe and Ni) can be used as well. Hydrolyzable compounds of the lanthanides can also be used.

Preferred metal compounds are for example the alkoxides of Na, K, Al, Zr and Ti. Suitable hydrolyzable metal compounds are for example $Al(OCH_3)_3$, $Al(OC_2H_5)_3$, $Al(O\text{-}n\text{-}C_3H_7)_3$, $Al(O\text{-}i\text{-}C_3H_7)_3$, $Al(O\text{-}n\text{-}C_4H_9)_3$, $Al(O\text{-sec-}C_4H_9)_3$, $AlCl_3$, $AlCl(OH)_2$, $Al(OC_2H_4OC_4H_9)_3$, $TiCl_4$, $Ti(OC_2H_5)_4$, $Ti(O\text{-}n\text{-}C_3H_7)_4$, $Ti(O\text{-}i\text{-}C_3H_7)_4$, $Ti(OC_4H_9)_4$, $Ti(2\text{-ethylhexoxy})_4$, $ZrCl_4$, $Zr(OC_2H_5)_4$, $Zr(O\text{-}n\text{-}C_3H_7)_4$, $Zr(O\text{-}i\text{-}C_3H_7)_4$, $Zr(OC_4H_9)_4$, $ZrOCl_2$, $Zr(2\text{-ethylhexoxy})_4$, as well as Zr compounds which have complexing radicals, such as β-diketone and (meth)acryl radicals, sodium ethoxide, potassium acetate, boric acid, $BCl_3$, $B(OCH_3)_3$, $B(OC_2H_5)_3$, $SnCl_4$, $Sn(OCH_3)_4$, $Sn(OC_2H_5)_4$, $VOCl_3$ und $VO(OCH_3)_3$.

The hydrolysates or precondensates of the consolidation agent are obtained from the silanes and the hydrolyzable compounds, respectively, by hydrolysis and condensation. In particular, hydrolysates and condensates are understood to be hydrolyzed or at least partially condensed compounds of the hydrolyzable starting compounds. Instead of such hydrolyzable monomer compounds, compounds already precondensed may also be employed. Such oligomers, preferably soluble in the reaction medium, may for example be straight-chain or cyclic low-molecular-weight partial condensates (for example polyorganosiloxanes) having a degree of condensation of e.g. from about 2 to 100, in particular from about 2 to 6.

The hydrolysates or precondensates are preferably obtained by hydrolysis and condensation of the hydrolyzable starting compounds by the sol-gel process. During sol-gel process the hydrolyzable compounds are hydrolyzed and at least partially condensed with water, optionally in the presence of acidic or basic catalysts. It is preferred that hydrolysis and condensation is carried out in the presence of acidic condensation catalysts (e.g. hydrochloric acid, phosphoric acid, or formic acid) at a pH of preferably from 1 to 3. The sol to be formed may be adjusted to the viscosity desired for the consolidation agent by appropriate parameters, such as for example degree of condensation, solvent or pH value.

Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

Stoichiometric amounts of water as well as smaller or larger amounts may be used for hydrolysis and condensation. It is preferred that a substoichiometric amount of water based on the hydrolyzable groups present is employed. The amount of water employed for hydrolysis and condensation of the hydrolyzable compounds is preferably from 0.1 to 0.9 mol, and particularly preferably from 0.25 to 0.75 mol, of water per mol of the hydrolyzable groups which are present. Particularly good results are often achieved with less than 0.5 mol of water, in particular from 0.35 to 0.45 mol of water per mol of the hydrolyzable groups which are present.

The consolidation agent may be activated by the addition of a further amount of water before application.

The consolidation agent of the invention is normally particle-free in form of a solution or emulsion. It may contain common additives, for example solvents such as water, alcohols, preferably lower aliphatic alcohols ($C_1$-$C_8$-alcohols) such as methanol, ethanol, 1-propanol, isopropanol and 1-butanol, ketones, preferably lower dialkyl ketones, such as acetone and methyl isobutyl ketone, ethers, preferably lower dialkyl ethers, such as diethyl ether, or monoethers of diols, such as ethylene glycol or propylene glycol, with $C_1$-$C_8$-alcohols, amides such as dimethylformamide, tetrahydrofuran, dioxane, sulfoxides, sulfones or butylglycol and mixtures thereof. Water and alcohols are preferably used. High-boiling solvents may also be used, for example polyethers such as triethylene glycol, diethylene glycol diethyl ether and tetraethylene glycol dimethyl ether. In some cases other solvents may also be used, for example light liquid paraffin (petroleum ether, alkanes, and cycloalkanes), aromatic compounds, heteroaromatics and halogenated hydrocarbons.

Other common additives are for example dyes, pigments, viscosity regulators and surfactants. For preparing emulsions of the consolidation agent stabilizing emulsifiers common for silicone emulsions such as for example Tween® 80 and Brij® 30 can be used.

For preparing consolidated moulded articles the consolidation agent either may be blended with a particulate material to be consolidated or the material to be consolidated may be coated with the consolidation agent. The actual consolidation (curing) may for example be effected thermally by supplying heat. Another way of curing is the addition of condensation catalysts that cause crosslinking of the inorganically crosslinkable SiOH groups or metal OH groups forming an inorganic network. Condensation catalysts suitable for this are for example bases, but also fluoride ions or alkoxides of fast reacting metals such as for example titanium alkoxides, tin alkoxides or zirconium alkoxides. In the case of using starting compounds having polymerizable or polycondensable groups such as methacryloxy groups or epoxide groups the polymerization, polyaddition or polycondensation process may be initiated by adding thermal initiators or free radical initiators.

The consolidation agent of the invention is suitable for consolidating any inorganic solids having the shape of powder, granulate, pellet, fibre or a similar particulate shape. The particles may have a size in the order of sub-µm or the particles may also be in the range of mm and greater. Other solids which can be used are for example hollow glass micro spheres or fibres, for example such as those employed for preparing brake linings. Natural materials, which for example may be of mineral nature, as well as metals or for example synthetically prepared moulded articles from finest metal powders, from ceramic powders, from glass or from combinations of both, such as glass-ceramics or cermets, may be considered.

A special type of consolidated moulded articles are so-called "proppants" employed in offshore crude oil recovery, i.e. pellets that will be introduced into channels of the oil-bearing geological formation to keep it free and to stabilize the transport capacity.

The consolidation agent of the invention can advantageously be employed for crude oil recovery, especially for offshore exploitation, by infiltrating or injecting the consolidation agent into the oil-bearing geological formation and curing the consolidation agent thermally, by addition of condensation catalysts and/or polymerization initiating agents.

The consolidation agent of the invention makes possible the rapid and efficient solidification of the oil-bearing, mostly sand containing geological formations due to its chemical constitution. In this connection the use of phenylsilanealkoxides has a particular performance. This probably resides on the fact that these compounds have OH groups that are not capable of reacting rapidly due to steric hindrance of the phenyl group and electronic effects, which will attach particularly good to the surface of inorganic materials. Further, it was found that such systems are also particularly good for oil-soiled particles, since the consolidation agent is capable of infiltrating and releasing the oil layer on the inorganic surface, whereby bridge bonds between adjacent granulate particles are possible. The latter includes the additional effect that such systems are also appropriate for releasing fats and oils from inorganic surfaces and for example for improving the discharge of such substances from gussets of sand beddings as well as geological formations. Thus, it is possible to realize binding processes in oil-containing sands and to purify such sands from oil.

The following examples illustrate the invention.

Example 1

Preparation of a Particle-Free Consolidation Agent for the Purpose of Solidifying Oil-Containing Sands 13.75 g of methyltriethoxysilane (MTEOS) and 64.33 g of tetraethoxysilane (TEOS) are mixed and reacted with 22.15 g of deionized water and 0.22 ml of concentrated hydrochloric acid (37%) with intensive stirring. After the end point the reaction mixture exceeds a maximum temperature of 73° C. After cooling the reaction mixture to 58° C., a further silane mixture consisting of 22.1 g of phenyltriethoxysilane, 49.1 g of MTEOS and 19.1 g of TEOS is added to the batch and stirring is continued for 5 minutes. After standing overnight the batch is adjusted to a pH value of about 3 with 0.25 ml of an ethanolic (21% by weight) Na ethoxylate solution.

Prior to processing, 5% by weight of water are added to the consolidation agent for activation. The consolidation agent activated can be used for solidifying oil-containing sands. For that, for example 100 g sand H33 are mixed homogeneously with 10 g of a mixture containing oil/groundwater (weight ratio of 8:2), subsequently 12 g of activated consolidation agent are added to the sand thus pretreated and homogeneously distributed. After evaporation of ethanol the mixture obtained is packed into a mould, compressed at a press and cured at a temperature of 150° C. overnight. The moulded articles obtained show compression strengths in the range of 2.3 MPa and, after extraction of the oil with toluene for 4 hours and drying at 120° C. overnight, a porosity between 36 and 40%.

Example 2

Preparation of a Particle-Free Consolidation Agent for the Purpose of Solidifying Sand 13.75 g of MTEOS and 64.33 g of TEOS are mixed and reacted with 22.15 g of deionized water and 0.22 ml of concentrated hydrochloric acid (37%) with intensive stirring. After the end point the reaction mixture exceeds a maximum temperature of 73° C. After cooling the reaction mixture to 58° C., a further silane mixture consisting of 22.1 g of phenyltriethoxysilane, 49.1 g of MTEOS and 19.1 g of TEOS is added to the batch and stirring is continued for 5 minutes. After standing overnight the batch is adjusted to a pH value of about 3 with 0.25 ml of an ethanolic (21% by weight) Na ethoxylate solution.

Prior to processing, 5% by weight of water are added to the consolidation agent for activation. The consolidation agent activated can be used for solidifying sand. For that, for example 12 g of activated consolidation agent are added to 100 g of sand and mixed homogeneously. After evaporation of ethanol the mixture obtained is packed into a mould, compressed at a press and cured at 150° C. overnight.

Example 3

Preparation of a Particle-Free Consolidation Agent for the Purpose of Solidifying Granulates 13.75 g of MTEOS and 64.33 g of TEOS are mixed and reacted with 22.15 g of deionized water and 0.22 ml of concentrated hydrochloric acid (37%) with intensive stirring. After the end point the reaction mixture exceeds a maximum temperature of 73° C. After cooling the reaction mixture to 58° C., a further silane mixture consisting of 22.1 g of phenyltriethoxysilane, 49.1 g of MTEOS and 19.1 g of TEOS is added to the batch and stirring is continued for 5 minutes. After standing overnight the batch is adjusted to a pH value of about 3 with 0.25 ml of an ethanolic (21% by weight) Na ethoxylate solution.

Prior to processing, 5% by weight of water are added to the consolidation agent for activation. The consolidation agent activated can be used for solidifying granulate. For that, 12 g of activated consolidation agent are added to 100 g of granulate and mixed homogeneously. After evaporation of ethanol the mixture obtained is packed into a mould, compressed at a press and cured at 150° C. overnight.

Example 4

Preparation of a Particle-Free Consolidation Agent for the Purpose of Solidifying Oil Containing Granulates 13.75 g of MTEOS and 64.33 g of TEOS are mixed and reacted with 22.15 g of deionized water and 0.22 ml of concentrated hydrochloric acid (37%) with intensive stirring. After the end point the reaction mixture exceeds a maximum temperature of 73° C. After cooling the reaction mixture to 58° C., a further silane mixture consisting of 22.1 g of phenyltriethoxysilane, 49.1 g of MTEOS and 19.1 g of TEOS is added to the batch and stirring is continued for 5 minutes.

After standing overnight the batch is adjusted to a pH value of about 3 with 0.25 ml of an ethanolic (21% by weight) Na ethoxylate solution.

Prior to processing, 5% by weight of water are added to the consolidation agent for activation. The consolidation agent activated can be used for solidifying oil containing granulates. For that, 100 g of granulate are mixed homogeneously with 10 g of a mixture containing oil/groundwater (weight ratio of 8:2). Subsequently, 15 g of activated consolidation agent are added to the granulate thus pretreated and homogeneously distributed. After evaporation of ethanol the mixture obtained is packed into a mould, compressed at a press and cured at 150° C. overnight.

Example 5

Preparation of a Coating Material for the Purpose of Altering the Wetting Ability of Porous Sandstones Towards Oil a) 236 g of the batch of consolidation agent of example 1 are adjusted to a $R_{OR}$ value (mol of water per mol of hydrolyzable group) of 0.6 by the addition of 5% by weight of water. 7.45 g of 1H,1H,2H,2H-perfluorooctyltriethoxysilane (FTS) are added to the batch after stirring for 5 minutes. The batch is stirred for further 30 minutes and then adjusted to a pH value of about 3 by adding 0.31 ml of an ethanolic (21% by weight) Na ethoxylate solution.

100 g of the batch are diluted with 220 g of diethylene glycol monoethyl ether to use it as a wetting regulating consolidation agent for porous sandstones.

What is claimed is:

1. A consolidated material, wherein before consolidation the material is at least one of porous and particulate and wherein the material is consolidated with a consolidating agent which is particle-free and comprises at least one of a hydrolysate and a precondensate of (a) one or more organosilanes of formula (I)

$$R_nSiX_{4-n} \quad (I)$$

wherein the radicals R independently represent non-hydrolysable groups, the radicals X independently represent hydrolysable groups or hydroxyl groups, and n is 1, 2 or 3, and (b) one or more hydrolysable silanes of formula (II)

$$SiX_4 \quad (II)$$

wherein the radicals X are as defined for formula (I), provided that the agent comprises at least one of a hydrolysate and a precondensate of compounds which comprise methyltriethoxysilane, phenyltriethoxysilane, and tetraethoxysilane.

2. The consolidated material of claim 1, wherein the at least one of a hydrolysate and a precondensate has been prepared in the presence of one or more metal compounds of formula (III)

$$MX_a \quad (III)$$

wherein M is selected from metals of main groups I to VIII or subgroups II to VIII of the Periodic Table of Elements and wherein the radicals X independently represent hydrolysable groups or hydroxyl groups and two radicals X may be combined to form an oxo group, and a corresponds to the valence of M.

3. The consolidated material of claim 1, wherein before consolidation the material is porous.

4. The consolidated material of claim 3, wherein the material comprises sandstone.

5. The consolidated material of claim 1, wherein the consolidated material is present as a molded article.

6. The consolidated material of claim 5, wherein the material before consolidation comprises sand.

7. The consolidated material of claim 5, wherein the material before consolidation comprises granules.

8. The consolidated material of claim 5, wherein the material before consolidation comprises one or more of glass, a metal powder, a ceramic powder, glass-ceramic, and a cermet.

9. A consolidated material, wherein before consolidation the material is at least one of porous and particulate and comprises sandstone and wherein the material is consolidated with a consolidating agent which is particle-free and comprises at least one of a hydrolysate and a precondensate of (a) one or more organosilanes of formula (I)

$$R_nSiX_{4-n} \quad (I)$$

wherein the radicals R independently represent non-hydrolysable groups, the radicals X independently represent hydrolysable groups or hydroxyl groups, and n is 1, 2 or 3, at least one of the one or more organosilanes of formula (I) being an arylsilane; and (b) optionally, one or more hydrolysable silanes of formula (II)

$$SiX_4 \quad (II)$$

wherein the radicals X are as defined for formula (I).

10. The consolidated material of claim 9, wherein the agent comprises at least one of a hydrolysate and a precondensate of compounds comprising (a1) an alkylsilane, (a2) an arylsilane, and (b) an orthosilicic ester.

11. The consolidated material of claim 9, wherein the at least one of a hydrolysate and a precondensate has been prepared in the presence of one or more metal compounds of formula (III)

$$MX_a \quad (III)$$

wherein M is selected from metals of main groups I to VIII or subgroups II to VIII of the Periodic Table of Elements and wherein the radicals X independently represent hydrolysable groups or hydroxyl groups and two radicals X may be combined to form an oxo group, and a corresponds to the valence of M.

12. The consolidated material of claim 9, wherein before consolidation the material is porous.

13. The consolidated material of claim 9, wherein the consolidated material is present as a molded article.

14. A consolidated material, wherein before consolidation the material is at least one of porous and particulate and comprises sand and wherein the material is consolidated with a consolidating agent which is particle-free and comprises at least one of a hydrolysate and a precondensate of (a) one or more organosilanes of formula (I)

$$R_nSiX_{4-n} \quad (I)$$

wherein the radicals R independently represent non-hydrolysable groups, the radicals X independently represent hydrolysable groups or hydroxyl groups, and n is 1, 2 or 3, at least one of the one or more organosilanes of formula (I) being an arylsilane; and (b) optionally, one or more hydrolysable silanes of formula (II)

$$SiX_4 \quad (II)$$

wherein the radicals X are as defined for formula (I).

15. The consolidated material of claim 14, wherein the agent comprises at least one of a hydrolysate and a precondensate of compounds comprising (a1) an alkylsilane, (a2) an arylsilane, and (b) an orthosilicic ester.

16. The consolidated material of claim 14, wherein the at least one of a hydrolysate and a precondensate has been prepared in the presence of one or more metal compounds of formula (III)

$$MX_a \qquad (III)$$

wherein M is selected from metals of main groups I to VIII or subgroups II to VIII of the Periodic Table of Elements and wherein the radicals X independently represent hydrolysable groups or hydroxyl groups and two radicals X may be combined to form an oxo group, and a corresponds to the valence of M.

17. The consolidated material of claim 14, wherein before consolidation the material is porous.

18. The consolidated material of claim 14, wherein the consolidated material is present as a molded article.

* * * * *